US008400030B1

(12) United States Patent
Tang et al.

(10) Patent No.: US 8,400,030 B1
(45) Date of Patent: Mar. 19, 2013

(54) HYBRID ELECTRIC TRANSMISSION FLUID

(75) Inventors: Hong-Zhi Tang, Glen Allen, VA (US);
Mark T. Devlin, Richmond, VA (US);
Naresh Mathur, Midlothian, VA (US);
Lee D. Saathoff, Glen Allen, VA (US);
Timothy J. Henly, Maidens, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 13/492,965

(22) Filed: Jun. 11, 2012

(51) Int. Cl.
*H02K 9/00* (2006.01)
*H02K 9/20* (2006.01)

(52) U.S. Cl. ............ 310/54; 310/90; 508/192; 508/460; 508/468; 508/498

(58) Field of Classification Search .................. 310/54, 310/90; 508/192, 460, 498; *H02K 9/00, H02K 9/20*
See application file for complete search history.

(56) References Cited

U.S. PATENT DOCUMENTS

| | | | |
|---|---|---|---|
| 2,749,311 A | 6/1956 | Sabol et al. | |
| 2,760,933 A | 8/1956 | Fields et al. | |
| 2,765,289 A | 10/1956 | Fields et al. | |
| 2,850,453 A | 9/1958 | Fields | |
| 2,910,439 A | 10/1959 | Fields | |
| 3,663,561 A | 5/1972 | Blaha | |
| 3,840,549 A | 10/1974 | Blaha | |
| 3,862,798 A | 1/1975 | Hopkins | |
| 4,029,588 A | 6/1977 | Koch | |
| 4,943,672 A | 7/1990 | Hamner et al. | |
| 5,344,579 A | 9/1994 | Ohtani et al. | |
| 5,372,735 A | 12/1994 | Ohtani et al. | |
| 5,441,656 A | 8/1995 | Ohtani et al. | |
| 5,513,719 A * | 5/1996 | Moroto et al. | 180/65.21 |
| 5,696,066 A * | 12/1997 | Kinker et al. | 508/469 |
| 5,882,505 A | 3/1999 | Wittenbrink et al. | |
| 6,013,171 A | 1/2000 | Cook et al. | |
| 6,080,301 A | 6/2000 | Berlowitz et al. | |
| 6,096,940 A | 8/2000 | Wittenbrink et al. | |
| 6,103,099 A | 8/2000 | Wittenbrink et al. | |
| 6,165,949 A | 12/2000 | Berlowitz et al. | |
| 6,180,575 B1 | 1/2001 | Nipe | |
| 6,548,458 B2 | 4/2003 | Loper | |
| 7,307,048 B2 | 12/2007 | Sagawa et al. | |
| 7,514,394 B2 * | 4/2009 | Kodali et al. | 508/486 |
| 7,795,193 B2 | 9/2010 | Takei et al. | |
| 8,076,809 B2 | 12/2011 | Tingler et al. | |
| 2005/0176597 A1* | 8/2005 | Kodali et al. | 508/506 |
| 2007/0142238 A1* | 6/2007 | Katafuchi | 508/192 |
| 2008/0058233 A1 | 3/2008 | Sagawa et al. | |
| 2008/0194442 A1 | 8/2008 | Watts et al. | |
| 2008/0305972 A1* | 12/2008 | Devlin et al. | 508/421 |

(Continued)

FOREIGN PATENT DOCUMENTS

WO 2011113851 A1 9/2011
WO 2011147277 A1 12/2011

*Primary Examiner* — John K Kim
(74) *Attorney, Agent, or Firm* — Luedeka Neely Group, P.C.

(57) ABSTRACT

A dispersant additive composition, a lubricant composition containing the dispersant additive, a transmission containing the dispersant additive, and a method of providing a versatile lubricating fluid. The dispersant includes a reaction product of a hydrocarbyl substituted carboxylic acid or anhydride and an amine. The reaction product has a nitrogen content up to 10,000 ppm by weight, and a boron plus phosphorus to nitrogen ((B+P)/N) weight ratio of from 0:1 to about 0.8:1. The dispersant additive composition is effective to provide an electrical conductivity to a lubricant composition containing the dispersant additive composition and a metal detergent of less than about 1700 pS/m.

24 Claims, 1 Drawing Sheet

U.S. PATENT DOCUMENTS

| | | |
|---|---|---|
| 2009/0036337 A1 | 2/2009 | Deskin et al. |
| 2010/0216676 A1* | 8/2010 | Ichihashi et al. ............. 508/287 |
| 2010/0279904 A1 | 11/2010 | Deskin et al. |
| 2010/0331224 A1* | 12/2010 | Boffa et al. ................. 508/287 |
| 2011/0092402 A1 | 4/2011 | Sagawa et al. |
| 2011/0212863 A1* | 9/2011 | Yagishita ..................... 508/192 |
| 2012/0032543 A1 | 2/2012 | Chakraborty et al. |

* cited by examiner

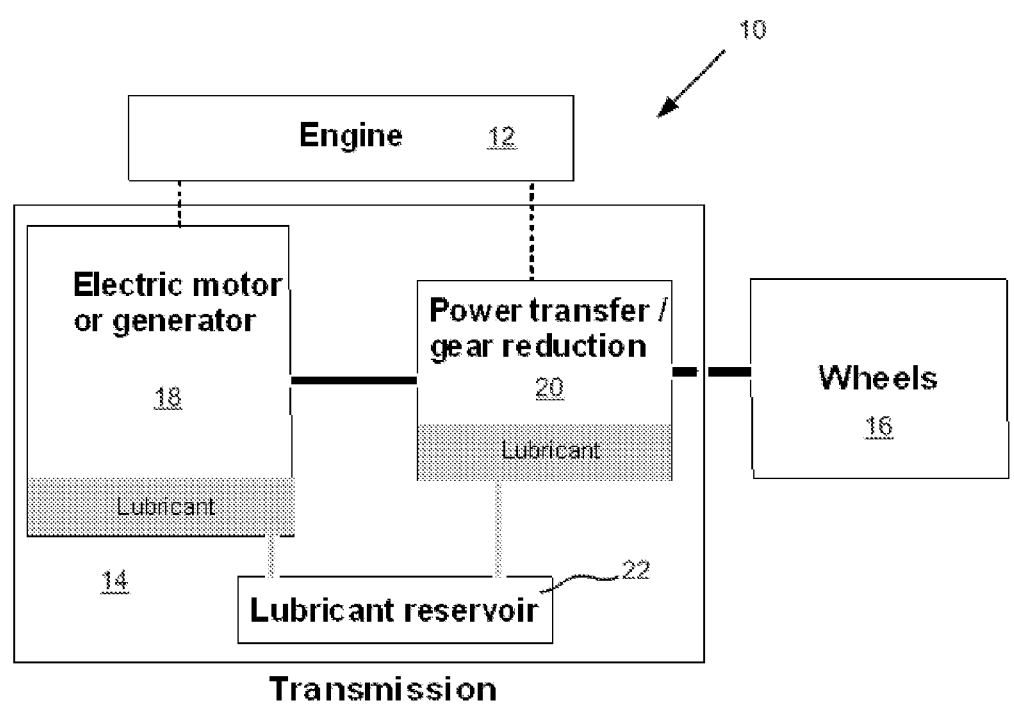

HYBRID ELECTRIC TRANSMISSION FLUID

FIELD

The present disclosure relates to lubricating compositions, additive packages, and methods for lubricating a transmission, particularly a hybrid electric transmission for a vehicle.

BACKGROUND AND SUMMARY

A transmission system for a vehicle is suitably configured to deliver improved power transmitting efficiency, and improved fuel efficiency. A conventional transmission mechanism may be a manual transmission, a conventional stepped automatic transmission, a continuously variable transmission, a double clutch transmission, or other type of vehicle transmission. Such transmissions are typically used with conventional gasoline or diesel engine systems.

By contrast, electric vehicles are equipped with electric motors, and hybrid electric vehicles may have electric motor(s) in combination with a combustion engine. In such vehicles, a transmission containing a transmission fluid is provided that is separate from an electric motor and electric motor oil used to power the transmission.

In a hybrid electric transmission, the transmission fluid may be in contact with parts of the electric motor or a similar fluid may be used for both the transmission and for cooling and lubricating the motor. For example, the lubricating and cooling fluid for the motor may be in contact with electrical windings in the stator, in order to efficiently cool the electric motor and to insulate the electrical parts to prevent a short circuit of the electric motor. Accordingly, such fluid desirably has a relatively low electrical conductivity so that the electric motor can operate properly without short-circuiting.

A hybrid vehicle 10 is illustrated schematically in FIG. 1 and may contain an engine 12 and transmission 14 for powering wheels 16 of the vehicle 10. The transmission 14 may include an electric motor 18 and a power transfer/gear reduction unit 20 coupled to the wheels 16. A common lubricant reservoir 22 may contain a lubricant composition as described herein for lubricating both the electric motor 18 and the power transfer/gear reduction unit 20.

A lubricant additive that contributes to an increase in electrical conductivity is a metal containing detergent. Such detergents are required to be present in an amount that enables the fluid to provide suitable anti-rust performance. Accordingly, there is a tension between providing lower amounts of detergent in order to achieve suitable electrical conductivity for the fluid and higher amounts of detergent required to provide suitable anti-rust performance.

With the current trend toward more energy efficient vehicles, it is desirable to provide a multipurpose or dual-purpose lubricating fluid that may be used to lubricate mechanical components as well as provide lubrication and cooling to electromechanical components in electric vehicles and/or hybrid electric vehicles. Accordingly, it is desirable to provide a fluid that may meet electric motor oil requirements, such as lower electrical conductivity, cooling capability (high heat capacity, high thermal conductivity), and low Noack volatility, in addition to lubricity requirements for a transmission, such as a manual transmission, an automatic transmission, a continuously variable transmission, or a double clutch transmission.

In view of the foregoing, embodiments of the disclosure provide a dispersant additive composition, a lubricant composition containing the dispersant additive, a transmission containing the dispersant additive, and a method of providing a versatile lubricating fluid. The dispersant includes a reaction product of a hydrocarbyl substituted carboxylic acid or anhydride and an amine. The reaction product has a nitrogen content up to 10,000 ppm by weight, and a boron plus phosphorus to nitrogen ((B+P)/N) weight ratio of from 0:1 to about 0.8:1. The dispersant additive composition in combination with a metal detergent is effective to provide an electrical conductivity to a lubricant composition of less than about 1700 pS/m.

Another embodiment of the disclosure provides a transmission that includes an electric motor and a lubricating fluid. The lubricating fluid is in contact with said electric motor; and includes (1) an oil of lubricating viscosity; and (2) a dispersant additive composition including a reaction product of a hydrocarbyl substituted carboxylic acid or anhydride and an amine. The reaction product has a nitrogen content up to 10,000 ppm by weight and a boron plus phosphorus to nitrogen ((B+P)/N) weight ratio of from 0:1 to about 0.8:1. The dispersant additive composition in combination with a metal detergent is effective to provide an electrical conductivity to a lubricant composition of less than about 1700 pS/m.

Other embodiments of the disclosure provide a lubricating composition for a hybrid vehicle. The lubricating composition includes (1) a base oil of lubricating viscosity; (2) a dispersant additive derived from a hydrocarbyl substituted carboxylic acid or anhydride and an amine; and (3) a metal-containing detergent. The dispersant additive has a content up to 10000 ppm by weight, and a boron plus phosphorus to nitrogen ((B+P)/N) weight ratio of from 0:1 to about 0.8:1. The dispersant additive plus metal-containing detergent is effective to provide the lubricating composition with an electrical conductivity of less than about 1700 pS/m.

A further embodiment of the disclosure provides a method for providing a versatile lubricating fluid for lubricating a hybrid vehicle. The method includes blending an oil of lubricating viscosity with a dispersant additive and a metal-containing detergent to provide a lubricant composition having an electrical conductivity of less than about 1700 pS/m. The dispersant additive has a nitrogen content up to 10,000 ppm by weight and a boron plus phosphorus to nitrogen ((B+P)/N) weight ratio of from 0:1 to about 0.8:1.

In one embodiment, the dispersant is a succinimide dispersant.

In another embodiment, the metal-containing detergent is present in an amount that is sufficient to provide from about 60 to less than about 600 ppm by weight metal to the lubricant composition.

Additional features and advantages of the disclosure may be set forth in part in the description which follows, and/or may be learned by practice of the disclosure. The features and advantages of the disclosure may be further realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

FIG. 1 is a schematic block diagram of a hybrid vehicle containing a transmission according to an embodiment of the disclosure.

DESCRIPTION OF THE EMBODIMENTS

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents such as pyridyl, furyl, thienyl, and imidazolyl. In general, no more than two, for example, no more than one, non-hydrocarbon substituent will be present for every ten carbon atoms in the hydrocarbyl group; typically, there will be no non-hydrocarbon substituents in the hydrocarbyl group.

As used herein, the term "percent by weight", unless expressly stated otherwise, means the percentage the recited component represents with respect to the total weight of the composition containing the recited component.

The terms "oil-soluble" or "dispersible" used herein do not necessarily indicate that the compounds or additives are soluble, dissolvable, miscible, or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

Oil of Lubricating Viscosity

Base oils suitable for use in formulating lubricant compositions according to the disclosure may be selected from any of suitable synthetic or natural oils or mixtures thereof. Natural oils may include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale may also be suitable. The base oil typically may have a viscosity of about 2 to about 15 cSt or, as a further example, about 2 to about 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly(1-octenes), poly(1-decenes), etc. and mixtures thereof; alkyl-benzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-poly-isopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Hence, the base oil used which may be used to make the engine lubricant compositions as described herein may be selected from any of the base oils in Groups I-V as specified in the American Petroleum Institute (API) Base Oil Interchangeability Guidelines. Such base oil groups are as follows:

TABLE 1

| Base Oil Group[1] | Sulfur (wt %) | | Saturates (wt %) | Viscosity Index |
|---|---|---|---|---|
| Group I | >0.03 | And/or | <90 | 80 to 120 |
| Group II | ≦0.03 | And | ≧90 | 80 to 120 |
| Group III | ≦0.03 | And | ≧90 | ≧120 |
| Group IV | | all polyalphaolefins (PAOs) | | |
| Group V | | all others not included in Groups I-IV | | |

[1]Groups I-III are mineral oil base stocks.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15, or from about 3 to about 12, or from about 4 to about 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. No. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with an additive composition as disclosed in embodiments herein to provide a universal fluid composition for hybrid vehicles. Accordingly, the base oil may be present in the fluid composition described herein in an amount ranging from about 50 wt % to about 95 wt % based on a total weight of the fluid composition.

Dispersant Additive

In an aspect of the disclosed embodiments, the dispersant additive is a reaction product of a hydrocarbyl-dicarboxylic acid or anhydride and a polyamine. The hydrocarbyl moiety of the hydrocarbyl-dicarboxylic acid or anhydride of may be derived from butene polymers, for example polymers of isobutylene. Suitable polyisobutenes for use herein include those formed from polyisobutylene or highly reactive polyisobutylene having at least about 60%, such as about 70% to about 90% and above, terminal vinylidene content. Suitable polyisobutenes may include those prepared using $BF_3$ catalysts. The average number molecular weight of the polyalkenyl substituent may vary over a wide range, for example from about 100 to about 5000, such as from about 500 to about 5000, as determined by gel permeation chromatography (GPC) as described above.

The dicarboxylic acid or anhydride of may be selected from carboxylic reactants other than maleic anhydride, such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters. A mole ratio of maleic anhydride to hydrocarbyl moiety in a reaction mixture used to make the hydrocarbyl-dicarboxylic acid or anhydride may vary widely. Accordingly, the mole ratio may vary from about 5:1 to about 1:5, for example from about 3:1 to about 1:3. A particularly suitable molar ratio of anhydride to hydrocarbyl moiety is from about 1:1 to less than about 1.6:1.

Any of numerous polyamines can be used as in preparing the dispersant additive. Non-limiting exemplary polyamines may include aminoguanidine bicarbonate (AGBC), diethylene triamine (DETA), triethylene tetramine (TETA), tetraethylene pentamine (TEPA), pentaethylene hexamine (PEHA) and heavy polyamines. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting polyamines which may be used to prepare the hydrocarbyl-substituted succinimide dispersant are disclosed in U.S. Pat. No. 6,548,458, the disclosure of which is incorporated herein by reference in its entirety. In an embodiment of the disclosure, the polyamine may be selected from tetraethylene pentamine (TEPA).

In an embodiment, the dispersant additive may be a compounds of formula (I):

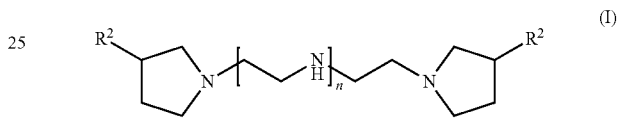

wherein n represents 0 or an integer of from 1 to 5, and $R^2$ is a hydrocarbyl substituent as defined above. In an embodiment, n is 3 and $R^2$ is a polyisobutenyl substituent, such as that derived from polyisobutylenes having at least about 60%, such as about 70% to about 90% and above, terminal vinylidene content. Compounds of formula (I) may be the reaction product of a hydrocarbyl-substituted succinic anhydride, such as a polyisobutenyl succinic anhydride (PIBSA), and a polyamine, for example tetraethylene pentamine (TEPA).

The foregoing compound of formula (I) may have a molar ratio of (A) polyisobutenyl-substituted succinic anhydride to (B) polyamine in the range of about 4:3 to about 1:10 in the compound. A particularly useful dispersant contains polyisobutenyl group of the polyisobutenyl-substituted succinic anhydride having a number average molecular weight (Mn) in the range of from about 500 to 5000 as determined by GPC and a (B) polyamine having a general formula $H_2N(CH_2)m-[NH(CH_2)_m]_n—NH_2$, wherein m is in the range from 2 to 4 and n is in the range of from 1 to 2.

The dispersant additive described herein may be boronated and/or phosphorylated. Accordingly, in one embodiment, the dispersant additive has a nitrogen content up to 10,000 ppm by weight, for example from about 0.5 to about 0.8 wt. % and a boron plus phosphorus to nitrogen ((B+P)/N) weight ratio of from 0:1 to about 0.8:1. In combination with a detergent additive described below, the dispersant additive composition is effective to provide an electrical conductivity to a lubricant composition of less than about 1700 pS/m. The amount of dispersant in the fluid composition may range from about 300 to about 1000 ppm by weight for example, from about 400 to about 900 ppm by weight in terms of nitrogen based on a total weight of the lubricant composition.

Metal Detergent

Metal detergents that may be used with the dispersant reaction product described above generally comprise a polar head with a long hydrophobic tail where the polar head comprises a metal salt of an acidic organic compound. The salts may contain a substantially stoichiometric amount of the metal, in which case they are usually described as normal or neutral salts, and would typically have a total base number or TBN (as measured by ASTM D2896) of from about 0 to less than about 150. Large amounts of a metal base may be included by reacting an excess of a metal compound such as an oxide or hydroxide with an acidic gas such as carbon dioxide. The resulting overbased detergent comprises micelles of neutralized detergent surrounding a core of inorganic metal base (e.g., hydrated carbonates). Such overbased detergents may have a TBN of about 150 or greater, such as from about 150 to about 450 or more.

Detergents that may be suitable for use in the present embodiments include oil-soluble overbased, low base, and neutral sulfonates, phenates, sulfurized phenates, and salicylates of a metal, particularly the alkali or alkaline earth metals, e.g., sodium, potassium, lithium, calcium, and magnesium. More than one metal may be present, for example, both calcium and magnesium. Mixtures of calcium and/or magnesium with sodium may also be suitable. Suitable metal detergents may be overbased calcium or magnesium sulfonates having a TBN of from 150 to 450 TBN, overbased calcium or magnesium phenates or sulfurized phenates having a TBN of from 150 to 300 TBN, and overbased calcium or magnesium salicylates having a TBN of from 130 to 350. Mixtures of such salts may also be used.

The metal-containing detergent may be present in a lubricating composition in an amount sufficient to improve the anti-rust performance of the lubricating fluid. For example, the amount of detergent in the lubricating fluid composition may range from about 0.5 wt % to about 5 wt %. As a further example, the metal-containing detergent may be present in an amount of from about 1.0 wt % to about 3.0 wt %. The metal-containing detergent may be present in a lubricating composition in an amount sufficient to provide from about 10 to about 5000 ppm alkali and/or alkaline earth metal to the lubricant composition based on a total weight of the lubricant composition. As a further example, the metal-containing detergent may be present in a lubricating composition in an amount sufficient to provide from about 40 to about 900 ppm alkali and/or alkaline earth metal. A particularly suitable amount of detergent in the lubricating fluid composition may provide from about 60 to about 600 ppm of alkali and/or alkaline earth metal to the lubricating fluid composition.

Other Optional Components

The lubricating fluid described herein may also include conventional additives of the type used in automatic transmission fluid formulations in addition to the components described above. Such additives include, but are not limited to, friction modifiers, antioxidants, extreme pressure additives, corrosion inhibitors, antiwear additives, antirust additives, metal deactivators, antifoamants, pour point depressants, air entrainment additives, seal swell agents, and the like.

Friction Modifiers

Friction modifiers are used in lubrication fluids as described herein to decrease friction between surfaces (e.g., the members of a torque converter clutch or a shifting clutch) at low sliding speeds. The result is a friction-vs.-velocity (u-v) curve that has a positive slope, which in turn leads to smooth clutch engagements and minimizes "stick-slip" behavior (e.g., shudder, noise, and harsh shifts).

Friction modifiers include such compounds as aliphatic amines or ethoxylated aliphatic amines, ether amines, alkoxylated ether amines, aliphatic fatty acid amides, acylated amines, aliphatic carboxylic acids, aliphatic carboxylic esters, polyol esters, aliphatic carboxylic ester-amides, imidazolines, tertiary amines, aliphatic phosphonates, aliphatic phosphates, aliphatic thiophosphonates, aliphatic thiophosphates, etc., wherein the aliphatic group usually contains one or more carbon atoms so as to render the compound suitably oil soluble. As a further example, the aliphatic group may contain about 8 or more carbon atoms. Also suitable are aliphatic substituted succinimides formed by reacting one or more aliphatic succinic acids or anhydrides with ammonia primary amines.

One group of friction modifiers includes the N-aliphatic hydrocarbyl-substituted diethanol amines in which the N-aliphatic hydrocarbyl-substituent is at least one straight chain aliphatic hydrocarbyl group free of acetylenic unsaturation and having in the range of about 14 to about 20 carbon atoms.

An example of a suitable friction modifier system is composed of a combination of at least one N-aliphatic hydrocarbyl-substituted diethanol amine and at least one N-aliphatic hydrocarbyl-substituted trimethylene diamine in which the N-aliphatic hydrocarbyl-substituent is at least one straight chain aliphatic hydrocarbyl group free of acetylenic unsaturation and having in the range of about 14 to about 20 carbon atoms. Further details concerning this friction modifier system are set forth in U.S. Pat. Nos. 5,372,735 and 5,441,656.

Another friction modifier system is based on the combination of (i) at least one di(hydroxyalkyl) aliphatic tertiary amine in which the hydroxyalkyl groups, being the same or different, each contain from 2 to about 4 carbon atoms, and in which the aliphatic group is an acyclic hydrocarbyl group containing from about 10 to about 25 carbon atoms, and (ii) at least one hydroxyalkyl aliphatic imidazoline in which the hydroxyalkyl group contains from 2 to about 4 carbon atoms, and in which the aliphatic group is an acyclic hydrocarbyl group containing from about 10 to about 25 carbon atoms. For further details concerning this friction modifier system, reference should be had to U.S. Pat. No. 5,344,579.

Generally speaking, the lubricating compositions described herein may contain up to about 1.25 wt %, or, as a further example, from about 0.05 to about 1 wt % of one or more friction modifiers.

Antioxidants

In some embodiments, antioxidant compounds may be included in the lubricating compositions described herein. Antioxidants include phenolic antioxidants, aromatic amine antioxidants, sulfurized phenolic antioxidants, and organic phosphites, among others. Examples of phenolic antioxidants include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl6-ter-t-butylphenol), mixed methylene-bridged polyalkyl phenols, and 4,4'-thiobis(2-methyl-6-tert-butylphenol). N,N'-di-sec-butyl-phenylenediamine, 4-isopropylamino-diphenylamine, phenyl-.alpha.-naphthyl amine, phenyl-.alpha.-naphthyl amine, and ring-alkylated diphenylamines. Examples include the sterically hindered tertiary butylated phenols, bisphenols and cinnamic acid derivatives and combinations thereof.

Aromatic amine antioxidants include, but are not limited to diarylamines having the formula:

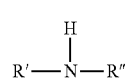

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyldiphenylamine; p-oriented styrenated diphenylamine; mixed butyloctyldi-phenylamine; and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 weight % sulfur, when added to the finished lubricant at a 1.0 weight % treat level, will deliver 2000 ppm of sulfur to the finished lubricant. A sulfurized fatty oil or olefin containing 10 weight % sulfur, when added to the finished lubricant at a 1.0 weight % treat level, will deliver 1000 ppm sulfur to the finished lubricant. It is desirable that the sulfurized olefin or sulfurized fatty oil to deliver between 200 ppm and 2000 ppm sulfur to the finished lubricant. The total amount of antioxidant in the lubricating fluid compositions described herein may range from about 0.01 to about 3.0 wt % based on the total weight of the fluid composition. As a further example, antioxidant may be present in an amount from about 0.1 wt % to about 1.0 wt %.

Extreme Pressure/Anti-Wear Additives

The antiwear agents may include phosphorus-containing antiwear agents which may include an organic ester of phosphoric acid, phosphorous acid, or an amine salt thereof. For example, the phosphorus-containing antiwear agent may include one or more of a dihydrocarbyl phosphite, a trihydrocarbyl phosphite, a dihydrocarbyl phosphate, a trihydrocarbyl phosphate, any sulfur analogs thereof, and any amine salts thereof. As a further example, the phosphorus-containing antiwear agent may include at least one of dibutyl hydrogen phosphite and an amine salt of sulfurized dibutyl hydrogen phosphite.

The phosphorus-containing antiwear agent may be present in an amount sufficient to provide about 50 to about 500 parts per million by weight of phosphorus in the power lubricating fluid composition in combination with any phosphorus that may be provided by the dispersant additive. As a further example, the phosphorus-containing antiwear agent may be present in an amount sufficient to provide about 150 to about 300 parts per million by weight of phosphorus in the power transmission fluid in combination with any phosphorus that may be provided by the dispersant additive.

The lubricating fluid may include from about 0.01 wt % to about 1.0 wt % of the phosphorus-containing antiwear agent. As a further example, the lubricating fluid may include from about 0.2 wt % to about 0.3 wt % of the phosphorus-containing antiwear agent. As an example, the lubricating fluid may include from about 0.1 wt % to about 0.2 wt % of a dibutyl hydrogen phosphite or 0.3 wt % to about 0.4 wt % an amine salt of a sulfurized dibutyl hydrogen phosphate.

Corrosion Inhibitors

In some embodiments, copper corrosion inhibitors may constitute another class of additives suitable for inclusion in the lubricating compositions described herein. Such compounds include thiazoles, triazoles and thiadiazoles. Examples of such compounds include benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-bis(hydrocarbyldithio)-1,3,4-thiadiazoles. Suitable compounds include the 1,3,4-thiadiazoles, a number of which are available as articles of commerce, and also combinations of triazoles such as tolyltriazole with a 1,3,5-thiadiazole such as a 2,5-bis(alkyldithio)-1,3,4-thiadiazole. The 1,3,4-thiadiazoles are generally synthesized from hydrazine and carbon disulfide by known procedures. See, for example, U.S. Pat. Nos. 2,765,289; 2,749,311; 2,760,933; 2,850,453; 2,910,439; 3,663,561; 3,862,798; and 3,840,549.

Rust or corrosion inhibitors are another type of inhibitor additive for use in embodiments of the present disclosure. Such materials include monocarboxylic acids and polycarboxylic acids. Examples of suitable monocarboxylic acids are octanoic acid, decanoic acid and dodecanoic acid. Suitable polycarboxylic acids include dimer and trimer acids such as are produced from such acids as tall oil fatty acids, oleic acid, linoleic acid, or the like.

Another useful type of rust inhibitor may comprise alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable rust or corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof, and the like. Mixtures of such rust or corrosion inhibitors may be used. The amount of corrosion inhibitor in the transmission fluid formulations described herein may range from about 0.01 to about 2.0 wt % based on the total weight of the formulation.

Seal Swell Agents

The lubricating composition described herein may optionally contain seal swell agents such as alcohols, alkylbenzenes, substituted sulfolanes or mineral oils that cause swelling of elastomeric materials. Alcohol-type seal swell agents are low volatility linear alkyl alcohols. Examples of suitable alcohols include decyl alcohol, tridecyl alcohol and tetradecyl alcohol. Examples of alkylbenzenes useful as seal swell agents for use in conjunction with the compositions described herein include dodecylbenzenes, tetradecylbenzenes, dinonyl-benzenes, di(2-ethylhexyl)benzene, and the like. Examples of substituted sulfolanes are described in U.S. Pat. No. 4,029,588, incorporated herein by reference. Mineral oils useful as seal swell agents are typically low viscosity mineral oils with high naphthenic or aromatic content. When used in the lubricating composition described herein, a seal swell agent will typically comprise from about 1 to about 30 wt. %, preferably from about 2 to about 20 wt. %, most preferably from about 5 to about 15 wt. %, based on the total weight of the lubricating composition.

Anti-Foam Agents

In some embodiments, a foam inhibitor may form another component suitable for use in the lubricating compositions described herein. Foam inhibitors may be selected from silicones, polyacrylates, and the like. The amount of antifoam agent in the engine lubricant formulations described herein may range from about 0.001 wt % to about 0.1 wt % based on the total weight of the formulation. As a further example, antifoam agent may be present in an amount from about 0.004 wt % to about 0.10 wt %.

Additives used in formulating the compositions described herein can be blended into the base oil individually or in various sub-combinations. However, it is suitable to blend all of the components concurrently using an additive concentrate (i.e., additives plus a diluent, such as a hydrocarbon solvent). The use of an additive concentrate takes advantage of the mutual compatibility afforded by the combination of ingredients when in the form of an additive concentrate. Also, the use of a concentrate reduces blending time and lessens the possibility of blending errors.

In general terms, a suitable lubricating fluid may include additive components in the ranges listed in the following table.

TABLE 2

| Component | Wt. % (Broad) | Wt. % (Typical) |
| --- | --- | --- |
| Dispersant additive | 0.5-20.0 | 1.0-15.0 |
| Antioxidants | 0-2.0 | 0.01-1.0 |
| Metal Detergents | 0.1-10.0 | 0.5-5.0 |
| Corrosion Inhibitor | 0-1.0 | 0-0.5 |
| Extreme pressure/antiwear agents | 0.01-1.0 | 0.1-0.9 |
| Antifoaming agents | 0-1.0 | 0.001-0.1 |
| Pour point depressant | 0.001-1.0 | 0.01-0.5 |
| Friction modifiers | 0-2.0 | 0.05-1.0 |
| Demulsifiers | 0-2.0 | 0.001-1.0 |
| Base oil | Balance | Balance |
| Total | 100 | 100 |

EXAMPLES

The following non-limiting examples are provided in order to further illustrate the features and advantages of one or more embodiments of the disclosure. All of the fluids tested in the following table included the components as shown in Table 2 in order to provide a fully formulated lubricating fluid composition. In order to demonstrate how the dispersant affected the electrical conductivity of the fluid, all of the tested fluids contained an amount of overbased calcium sulfonate detergent sufficient to provide 120 ppm by weight calcium to the lubricating fluid composition based on a total weight of the lubricating fluid composition. The following dispersants were used in the examples in Table 4. The dispersants were identified by the particular succinic acid or anhydride to polyisobutene (SA/PIB) ratio of the dispersant.

TABLE 3

| Dispersant No. | SA/PIB wt. Ratio | Phosphorus (ppm by wt.) | Boron (ppm by wt.) | Nitrogen (ppm by wt.) | (B + P)/N ratio |
| --- | --- | --- | --- | --- | --- |
| 1 | 1.15 | 0 | 0 | 7270 | 0.000 |
| 2 | 1.15 | 384 | 28 | 7590 | 0.054 |
| 3 | 1.15 | 0 | 39 | 7650 | 0.005 |
| 4 | 1.15 | 450 | 0 | 7530 | 0.060 |
| 5 | 1.15 | 0 | 232 | 7260 | 0.032 |
| 6 | 1.15 | 1597 | 0 | 7290 | 0.219 |
| 7 | 1.15 | 1650 | 207 | 7400 | 0.251 |
| 8 | 1.15 | 1721 | 293 | 7140 | 0.282 |
| 9 | 1.15 | 3410 | 1786 | 7060 | 0.736 |
| 10 | 1.60 | 0 | 0 | 10100 | 0.000 |
| 11 | 1.15 | 0 | 0 | 20530 | 0.000 |
| 12 | 1.15 | 8088 | 0 | 18340 | 0.441 |
| 13 | 1.15 | 8060 | 3720 | 15500 | 0.760 |
| 14 | 1.15 | 0 | 8707 | 16490 | 0.528 |
| 15 | 1.15 | 6553 | 10173 | 16760 | 0.998 |
| 16 | N/A | 1402 | 730 | 2400 | 0.888 |

In Table 4, all of the dispersants are dispersants of the present disclosure. The amount of dispersant was varied to provide 310, 620 and 930 ppm by wt. of nitrogen to each of the lubricating fluid compositions. The conductivity of the lubricating fluids was measured and ranged from about 300 pS/m to about 1500 pS/m.

TABLE 4

| Dispersant No. | Fluid No. | Nitrogen from dispersant (ppm wt.) | Electrical conductivity of lubricating fluid (pS/m) | (B + P)/N ratio |
| --- | --- | --- | --- | --- |
| 1 | 1 | 310 | 600 | 0.000 |
| 1 | 2 | 620 | 400 | 0.000 |
| 1 | 3 | 930 | 300 | 0.000 |
| 2 | 1 | 310 | 700 | 0.054 |
| 2 | 2 | 620 | 600 | 0.054 |
| 2 | 3 | 930 | 500 | 0.054 |
| 3 | 1 | 310 | 800 | 0.005 |
| 3 | 2 | 620 | 600 | 0.005 |
| 3 | 3 | 930 | 500 | 0.005 |
| 4 | 1 | 310 | 700 | 0.060 |
| 4 | 2 | 620 | 600 | 0.060 |
| 4 | 3 | 930 | 500 | 0.060 |
| 5 | 1 | 310 | 600 | 0.032 |
| 5 | 2 | 620 | 400 | 0.032 |
| 5 | 3 | 930 | 400 | 0.032 |
| 6 | 1 | 310 | 500 | 0.219 |
| 6 | 2 | 620 | 600 | 0.219 |
| 6 | 3 | 930 | 600 | 0.219 |
| 7 | 1 | 310 | 500 | 0.251 |
| 7 | 2 | 620 | 600 | 0.251 |
| 7 | 3 | 930 | 600 | 0.251 |
| 8 | 1 | 310 | 700 | 0.282 |

TABLE 4-continued

| Dispersant No. | Fluid No. | Nitrogen from dispersant (ppm wt.) | Electrical conductivity of lubricating fluid (pS/m) | (B + P)/N ratio |
|---|---|---|---|---|
| 8 | 2 | 620 | 800 | 0.282 |
| 8 | 3 | 930 | 1000 | 0.282 |
| 9 | 1 | 310 | 900 | 0.736 |
| 9 | 2 | 620 | 1300 | 0.736 |
| 9 | 3 | 930 | 1500 | 0.736 |

In Table 5, comparative dispersants 10-16 were used to provide the same amount of nitrogen to the lubricating fluid compositions as in Table 4. The electrical conductivity of the lubricating fluids containing the comparative dispersants ranged from about 1300 pS/m to about 6100 pS/m. Target electrical conductivity for the fluid was no greater than about 1700 pS/m. The electrical conductivity of the fluid was measured at room temperature, approximately 22° C.

TABLE 5

| Dispersant No. | Fluid No. | Nitrogen from dispersant (ppm wt.) | Electrical conductivity of lubricating fluid (pS/m) | (B + P)/N ratio |
|---|---|---|---|---|
| 10 | 1 | 310 | 2300 | 0.000 |
| 10 | 2 | 620 | 1600 | 0.000 |
| 10 | 3 | 930 | 1300 | 0.000 |
| 11 | 1 | 310 | 2400 | 0.000 |
| 11 | 2 | 620 | 1400 | 0.000 |
| 11 | 3 | 930 | 1300 | 0.000 |
| 12 | 1 | 310 | 1300 | 0.441 |
| 12 | 2 | 620 | 1800 | 0.441 |
| 12 | 3 | 930 | 2400 | 0.441 |
| 13 | 1 | 310 | 1800 | 0.760 |
| 13 | 2 | 620 | 2700 | 0.760 |
| 13 | 3 | 930 | 3700 | 0.760 |
| 14 | 1 | 310 | 3000 | 0.528 |
| 14 | 2 | 620 | 3600 | 0.528 |
| 14 | 3 | 930 | 4500 | 0.528 |
| 15 | 1 | 310 | 2600 | 0.998 |
| 15 | 2 | 620 | 4300 | 0.998 |
| 15 | 3 | 930 | 6100 | 0.998 |
| 16 | 1 | 310 | 1600 | 0.888 |
| 16 | 2 | 620 | 2100 | 0.888 |
| 16 | 3 | 930 | 2000 | 0.888 |

In general the foregoing tables demonstrated that as the amount of dispersant additive in the lubricating composition is increased, and the higher the (B+P)/N ratio, the higher the lubricating fluid electrical conductivity. In the following example, the effects the metal containing detergent have on providing a lubricating fluid that passes a 24 hour rust test according to ASTM D-665A and has a conductivity that is 1700 pS/m or lower was demonstrated. All of the fluids in Table 6 were fully formulated with only the amount of detergent and dispersant varying to give the total amount of calcium and nitrogen indicated for each of the lubricating compositions.

TABLE 6

| Fluid No. | Ca from detergent (ppm by wt.) | Nitrogen from Dispersant 9 (ppm by wt.) | Anti-rust test ASTM D-655A | Electrical Conductivity (pS/m) |
|---|---|---|---|---|
| 1 | 60 | 310 | Pass | 1000 |
| 2 | 60 | 424 | Pass | 1100 |
| 3 | 120 | 310 | Pass | 1000 |
| 4 | 120 | 424 | Pass | 1300 |
| 5 | 60 | 930 | Fail | 1500 |
| 6 | 120 | 930 | Fail | 1600 |

TABLE 6-continued

| Fluid No. | Ca from detergent (ppm by wt.) | Nitrogen from Dispersant 9 (ppm by wt.) | Anti-rust test ASTM D-655A | Electrical Conductivity (pS/m) |
|---|---|---|---|---|
| 7 | 600 | 310 | Pass | 1800 |
| 8 | 600 | 424 | Pass | 1800 |
| 9 | 600 | 930 | Pass | 1900 |

As shown by the foregoing table, the particular dispersant and amount of detergent is important for determining if the lubricating fluid passes both the anti-rust test and the conductivity test. Fluids 1-4 were the only fluids that pass both the rust test and had an electrical conductivity no higher than 1700 pS/m. As shown by fluids 5 and 6, increasing the amount of nitrogen in the lubricating fluid resulting in the fluid failing the anti-rust test when relatively low amounts of detergent were used. If the amount of detergent is increased as in fluids 7-9 so that the fluid passed the anti-rust test, resulted in the fluids 7-9 having too high an electrical conductivity regardless of how much dispersant additive was used.

Other embodiments of the present disclosure will be apparent to those skilled in the art from consideration of the specification and practice of the invention disclosed herein. As used throughout the specification and claims, "a" and/or "an" may refer to one or more than one. Unless otherwise indicated, all numbers expressing quantities of ingredients, properties such as molecular weight, percent, weight percent, ratio, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the application by the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the invention being indicated by the following claims.

What is claimed is:

1. A dispersant additive composition comprising a reaction product of (a) a hydrocarbyl substituted carboxylic acid or anhydride and (b) an amine, wherein the reaction product has a nitrogen content ranging from about 2400 ppm up to 10,000 ppm by weight, and a boron plus phosphorus to nitrogen ((B+P)/N) weight ratio of from 0:1 to about 0.8:1, and wherein the dispersant additive composition in combination with a metal detergent is effective to provide an electrical conductivity to a lubricant composition of from about 300 pS/m to less than 1700 pS/m.

2. The dispersant additive of claim 1, wherein the reaction product has a nitrogen content ranging from about 5,000 to about 8,000 ppm by weight.

3. The dispersant additive of claim 1, wherein the reaction product has an acid or anhydride to hydrocarbyl molar ratio of less than 1.6.

4. A lubricant composition comprising the dispersant additive composition of claim 1 and alkali or alkaline earth metal detergent, wherein the detergent is present in an amount sufficient to provide less than 600 ppm by weight metal to the lubricant composition.

5. The lubricant composition of claim 4, wherein the detergent is present in an amount that is sufficient to provide from about 60 to less than 600 ppm by weight metal to the lubricant composition.

6. The lubricant composition of claim 4, wherein the amount of nitrogen from the dispersant additive composition is less than 930 ppm by weight and the amount of metal from the detergent ranges from about 5 to about 150 ppm by weight based on a total weight of the lubricant composition.

7. The lubricant composition of claim 4, wherein the dispersant additive composition is present in an amount sufficient to provide from about 300 to about 1000 ppm by weight nitrogen to the lubricant composition.

8. The lubricant composition of claim 4, wherein the dispersant additive composition is present in an amount sufficient to provide from about 300 to about 900 ppm by weight nitrogen to the lubricant composition.

9. A transmission comprising:
an electric motor;
a lubricating fluid;
wherein said lubricating fluid is in contact with said electric motor; and
wherein said lubricating fluid comprises:
(1) an oil of lubricating viscosity; and
(2) a dispersant additive composition comprising a reaction product of (a) a hydrocarbyl substituted carboxylic acid or anhydride and (b) an amine, wherein the reaction product has a nitrogen content ranging from about 2400 up to 10,000 ppm by weight, a boron plus phosphorus to nitrogen ((B+P)/N) weight ratio of from 0:1 to about 0.8:1, wherein the dispersant additive composition in combination with a metal detergent is effective to provide an electrical conductivity to a lubricant composition of from about 300 pS/m to less than 1700 pS/m.

10. The transmission of claim 9, wherein the dispersant additive composition has a nitrogen content ranging from about 5,000 to about 8,000 ppm by weight.

11. The transmission of claim 9, wherein the dispersant additive composition has an acid or anhydride to hydrocarbyl molar ratio of less than about 1.6.

12. The transmission of claim 9, wherein the lubricating fluid further comprises a metal containing detergent wherein the detergent is present in an amount sufficient to provide less than 600 ppm by weight metal to the lubricating fluid.

13. The transmission of claim 9, wherein the detergent is present in an amount that is sufficient to provide from about 60 to less than 600 ppm by weight metal to the lubricating fluid.

14. A lubricating composition for a hybrid vehicle comprising:
(1) a base oil of lubricating viscosity;
(2) a dispersant additive derived from (a) a hydrocarbyl substituted carboxylic acid or anhydride and (b) an amine, wherein the dispersant additive has a nitrogen content ranging from about 2400 up to 10,000 ppm by weight, a boron plus phosphorus to nitrogen ((B+P)/N) weight ratio of from 0:1 to about 0.8:1; and
(3) a metal-containing detergent,
wherein the dispersant additive plus metal-containing detergent is effective to provide the lubricating composition with an electrical conductivity of from about 300 pS/m to less than 1700 pS/m.

15. The lubricating composition of claim 14, wherein the dispersant additive has a nitrogen content ranging from about 5,000 to about 8,000 ppm by weight.

16. The lubricating composition of claim 14, wherein the dispersant comprises a succinimide dispersant.

17. The lubricating composition of claim 14, wherein the dispersant additive has an acid or anhydride to hydrocarbyl molar ratio of less than 1.6.

18. The lubricating composition of claim 14, wherein the detergent is present in an amount sufficient to provide less than 600 ppm by weight metal to the lubricant composition.

19. The lubricating composition of claim 14, wherein the detergent is present in an amount that is sufficient to provide from about 60 to less than 600 ppm by weight metal to the lubricant composition.

20. A method for providing a versatile lubricating fluid for lubricating a hybrid vehicle comprising:
blending an oil of lubricating viscosity with a dispersant additive and a metal-containing detergent to provide a lubricant composition having an electrical conductivity of from about 300 pS/m to less than 1700 pS/m,
wherein the dispersant additive has a nitrogen content ranging from 2400 up to 10,000 ppm by weight, and a boron plus phosphorus to nitrogen ((B+P)/N) weight ratio of from 0:1 to about 0.8:1.

21. The method of claim 20, wherein the dispersant additive has a nitrogen content ranging from about 5,000 to about 8,000 ppm by weight.

22. The method of claim 20, wherein the dispersant additive has an acid or anhydride to hydrocarbyl molar ratio of less than 1.6.

23. The method of claim 20, wherein the detergent is present in an amount sufficient to provide less than 600 ppm by weight metal to the lubricant composition.

24. The method of claim 20, wherein the detergent is present in an amount that is sufficient to provide from about 60 to less than 600 ppm by weight metal to the lubricant composition.

* * * * *

UNITED STATES PATENT AND TRADEMARK OFFICE
CERTIFICATE OF CORRECTION

PATENT NO. : 8,400,030 B1
APPLICATION NO. : 13/492965
DATED : March 19, 2013
INVENTOR(S) : Hong-Zhi Tang et al.

It is certified that error appears in the above-identified patent and that said Letters Patent is hereby corrected as shown below:

In the Specifications

In column 6, line 25, the chemical formula should appear as follows:

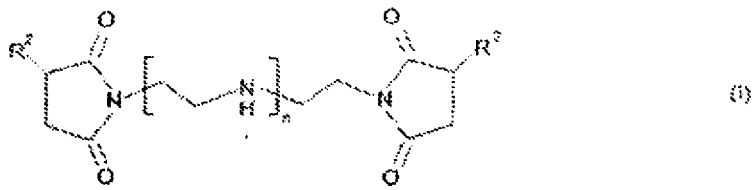

In column 11, line 58, that portion of Table 2 for Metal Detergents that reads "0.1-10.0" and "0.5-5.0" should read --0.01-10.0-- [for Wt. % (Broad)], and should read --0.05-5.0-- [for Wt. % (Typical)].

In column 12, Line 20, that portion of Table 3 that reads "SA/PIB wt. Ratio" should read --SA/PIB molar Ratio--.

Signed and Sealed this
Fourteenth Day of May, 2013

Teresa Stanek Rea
*Acting Director of the United States Patent and Trademark Office*